US012606748B2

(12) United States Patent
Lei et al.

(10) Patent No.: US 12,606,748 B2
(45) Date of Patent: Apr. 21, 2026

(54) METHOD FOR PREPARING HYDROGEN-RICH FUEL GAS BY CATALYZING BIOMASS TAR CRACKING USING ALUMINUM SMELTING WASTE RESIDUES

(71) Applicant: CHANGZHOU UNIVERSITY, Changzhou (CN)

(72) Inventors: Tingzhou Lei, Changzhou City (CN); Peng Liu, Changzhou City (CN); Xueqin Li, Changzhou City (CN); Wenxuan Chen, Changzhou City (CN); Yanling Li, Changzhou City (CN); Panpan Lang, Changzhou City (CN); Yantao Yang, Changzhou City (CN); Suxia Ren, Changzhou City (CN); Lili Dong, Changzhou City (CN); Taoli Huhe, Changzhou City (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 252 days.

(21) Appl. No.: 18/551,191

(22) PCT Filed: Nov. 7, 2022

(86) PCT No.: PCT/CN2022/130233
§ 371 (c)(1),
(2) Date: Sep. 18, 2023

(87) PCT Pub. No.: WO2023/093508
PCT Pub. Date: Jun. 1, 2023

(65) Prior Publication Data
US 2024/0174928 A1 May 30, 2024

(30) Foreign Application Priority Data
Nov. 29, 2021 (CN) .......................... 202111431596.7

(51) Int. Cl.
| | |
|---|---|
| *C10B 57/02* | (2006.01) |
| *B01J 21/04* | (2006.01) |
| *B01J 37/00* | (2006.01) |
| *B01J 37/08* | (2006.01) |
| *B01J 37/34* | (2006.01) |
| *C10B 53/02* | (2006.01) |
| *C10B 57/12* | (2006.01) |

(52) U.S. Cl.
CPC ............... *C10B 57/02* (2013.01); *B01J 21/04* (2013.01); *B01J 37/009* (2013.01); *B01J 37/08* (2013.01); *B01J 37/343* (2013.01); *C10B 53/02* (2013.01); *C10B 57/12* (2013.01)

(58) Field of Classification Search
CPC ......... C10B 53/02; C10B 57/02; C10B 57/06; C10B 57/12
See application file for complete search history.

(56) References Cited

U.S. PATENT DOCUMENTS

2014/0130402 A1 5/2014 Kastner

FOREIGN PATENT DOCUMENTS

| | | |
|---|---|---|
| CN | 110669534 A | 1/2020 |
| CN | 112588261 A | 4/2021 |
| CN | 114149816 A | 3/2022 |

OTHER PUBLICATIONS

English machine translation of CN 110669534 (Year: 2020).*

* cited by examiner

*Primary Examiner* — Renee Robinson
(74) *Attorney, Agent, or Firm* — IDEA Intellectual Limited; Sam T. Yip

(57) ABSTRACT

Disclosed is a method for preparing hydrogen-rich fuel gas, including adding aluminum smelting waste residues into medium strong acid and soaking for 2-4 h, filtering and baking obtained precipitate at 300-400° C. for 3-6 h to obtain pre-treated aluminum smelting waste residues; adding the waste residues into weak acid and performing ultrasonic treatment, performing centrifugal separation on an aluminum ash solution, baking for 3-6 h at a constant temperature of 400-500° C. in an air atmosphere, and naturally cooling to room temperature to obtain a cracking catalyst; uniformly mixing the cracking catalyst and biomass with a mass ratio of 1:1 and adding into a first-stage pyrolyzing furnace under $N_2$ atmosphere, and heating from room temperature to 500-900° C. to obtain first-stage pyrolysis gas; and entering the first-stage pyrolysis gas into a second-stage pyrolyzing furnace for secondary catalytic cracking, so as to obtain hydrogen-rich fuel gas.

9 Claims, 1 Drawing Sheet

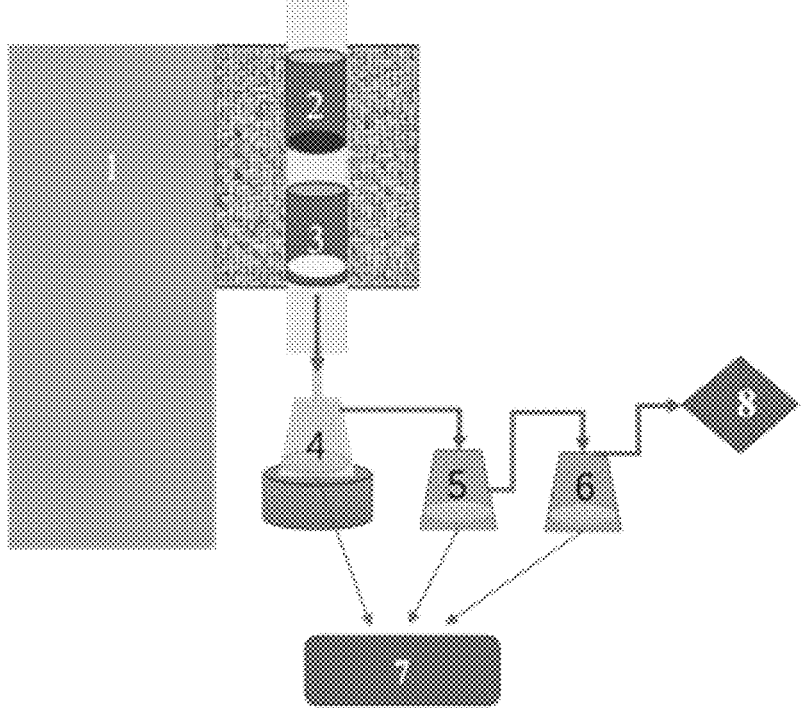

METHOD FOR PREPARING HYDROGEN-RICH FUEL GAS BY CATALYZING BIOMASS TAR CRACKING USING ALUMINUM SMELTING WASTE RESIDUES

CROSS-REFENCE TO RELATED APPLICATIONS

This application is a 371 application of the PCT application number PCT/CN2022/130233 filed Nov. 7, 2022 claiming priority to Chinese patent application No. 202111431596.7 filed on Nov. 29, 2021, and the disclosure of which are incorporated herein by reference in their entirety.

FIELD OF THE INVENTION

The present invention relates to the technical field of biomass energy utilization. in particular, it relates to a method for preparing hydrogen-rich fuel gas by catalyzing biomass tar cracking using aluminum smelting waste residues.

BACKGROUND OF THE INVENTION

With the development and application of green and efficient fuel cell technology, hydrogen has a significant market demand as a fuel. The production of hydrogen is primarily derived from the cracking and reforming of fossil fuels, accounting for up to 96%. However, due to the environmental and climate issues caused by the use of fossil fuels, researchers have begun to seek new energy sources for hydrogen production.

Biomass is widely available and has a slightly higher hydrogen content compared to fossil fuels such as coal, making it a potential source for hydrogen production that warrants research and development. However, during the biomass pyrolysis process for hydrogen production, a significant amount of tar is generated, which can lead to pipeline blockages and hinder industrialization. Additionally, biomass tar contains a high oxygen content, making it challenging to utilize in high-value applications. Therefore, the development of appropriate technologies for tar removal and utilization is necessary.

Catalytic cracking methods can convert tar into non-condensable gases such as hydrogen, methane, carbon monoxide, and carbon dioxide. However, currently, the catalysts used in catalytic cracking methods are relatively expensive and have poor selectivity towards hydrogen gas.

SUMMARY OF THE INVENTION

This section aims to summarize some aspects of the embodiments of the present invention and to briefly describe some preferred embodiments. Simplification or omission may be made in this section, the abstract of the specification, and the title to avoid obscuring the purposes of this section, the abstract of the specification, and the title. Such simplification or omission may not be used to limit the scope of the present invention.

The present invention is made in view of the technical problems as above-mentioned.

Therefore, the object of the present invention is to overcome the shortcomings in the prior art and provide a method for preparing hydrogen-rich fuel gas by catalyzing biomass tar cracking using aluminum smelting waste residues.

To solve the technical problems as above-mentioned, the present invention provides the following solutions: a method for preparing hydrogen-rich fuel gas by catalyzing biomass tar cracking using aluminum smelting waste residues, including:

adding aluminum smelting waste residues into a medium strong acid and soaking for 2-4 h, filtering and baking an obtained precipitate at 300° C. to 400° C. for 3-6 h to obtain pre-treated aluminum smelting waste residues;

adding the pre-treated aluminum smelting waste residues into a weak acid and performing ultrasonic treatment, performing centrifugal separation on an aluminum ash solution, baking the aluminum ash solution for 3-6 h at a constant temperature of 400° C. to 500° C. in an air atmosphere, and naturally cooling the aluminum ash solution to room temperature to obtain a cracking catalyst;

uniformly mixing the cracking catalyst and biomass with a mass ratio of 1:1 to form a mixture, adding the mixture into a first-stage pyrolyzing furnace under nitrogen atmosphere, and heating from room temperature to 500° C. to 900° C. to obtain first-stage pyrolysis gas; and entering the first-stage pyrolysis gas into a second-stage pyrolyzing furnace for secondary catalytic cracking, so as to obtain the hydrogen-rich fuel gas.

As a preferred embodiment of the method for preparing hydrogen-rich fuel gas by catalyzing biomass tar cracking using aluminum smelting waste residues, where the medium strong acid includes nitric acid, phosphoric acid and sulfuric acid.

As a preferred embodiment of the method for preparing hydrogen-rich fuel gas by catalyzing biomass tar cracking using aluminum smelting waste residues, where the medium strong acid has a concentration of 0.2 mol/L to 1 mol/L.

As a preferred embodiment of the method for preparing hydrogen-rich fuel gas by catalyzing biomass tar cracking using aluminum smelting waste residues, where the weak acid comprises acetic acid, hydrofluoric acid and phenol.

As a preferred embodiment of the method for preparing hydrogen-rich fuel gas by catalyzing biomass tar cracking using aluminum smelting waste residues, where the weak acid has a concentration of 1 mol/L to 5 mol/L.

As a preferred embodiment of the method for preparing hydrogen-rich fuel gas by catalyzing biomass tar cracking using aluminum smelting waste residues, where the first-stage pyrolyzing furnace has a heating rate of 20° C./min.

As a preferred embodiment of the method for preparing hydrogen-rich fuel gas by catalyzing biomass tar cracking using aluminum smelting waste residues, where the secondary catalytic cracking refers to heating the second-stage pyrolyzing furnace in the nitrogen atmosphere at a heating rate of 20° C./min until reaching a temperature of 500-900° C., and maintaining the heating for 20-30 minutes.

As a preferred embodiment of the method for preparing hydrogen-rich fuel gas by catalyzing biomass tar cracking using aluminum smelting waste residues, where the secondary catalytic cracking yields liquid products, pyrolysis gases, and char, with respective yields of 6%, 90%, and 4%.

As a preferred embodiment of the method for preparing hydrogen-rich fuel gas by catalyzing biomass tar cracking using aluminum smelting waste residues, where hydrogen yield is 224 ml/g, carbon monoxide yield is 90 ml/g, methane yield is 72 ml/g, and carbon dioxide yield is 99 ml/g in the pyrolysis gases.

As a preferred embodiment of the method for preparing hydrogen-rich fuel gas by catalyzing biomass tar cracking using aluminum smelting waste residues, where the biomass comprises corn stalks, poplar wood, and pine wood with a particle size ranging from 200 mesh to 400 mesh.

The present invention has the following advantages:

The present invention proposes a method for preparing hydrogen-rich fuel gas by catalyzing and reforming biomass tar cracking using aluminum smelting waste residues. The activated aluminum refining waste residue is employed as a catalyst to facilitate the directed production of hydrogen-rich fuel gas from biomass tar through catalytic cracking. This method enables the utilization of aluminum refining waste residue as a valuable resource while promoting hydrogen production from biomass tar, thereby facilitating the high-value utilization of biomass tar and advancing the industrialization of biomass pyrolysis and gasification processes.

By utilizing aluminum refining waste residue as both a pyrolysis catalyst and a catalyst for secondary tar cracking, the hydrogen yield can be significantly enhanced, resulting in an increase of over 200% in hydrogen production. The present invention effectively reduces tar yield, controlling it below 11%, while significantly decreasing the heavy components in the tar. This advancement promotes the industrialization process of the pyrolysis technology. By utilizing catalytic cracking of industrial waste, the invention optimizes the composition of the pyrolysis gas, achieving resource utilization of both tar and aluminum refining waste residue.

BRIEF DESCRIPTION OF THE DRAWINGS

In order to more clearly illustrate the technical solutions of the embodiments of the present invention, the following will briefly introduce the drawings needed to be used in the description of the embodiments. Obviously, the drawings in the following description are only some embodiments of the present invention. For those of ordinary skill in the art, other drawings can be obtained based on these drawings without any creative labor, in which:

The drawing depicts the system flowchart of the Example 1 in the present invention. It includes the following components: 1 pyrolysis furnace control system, 2 first-stage pyrolysis furnace, 3 second-stage pyrolysis furnace, 4 primary condenser, 5 secondary condenser, 6 tertiary condenser, 7 pyrolysis liquid product, 8 hydrogen-rich fuel gas.

DETAILED DESCRIPTION

To make the above-mentioned objectives, features and advantages more easily be understood, the following detailed description of the embodiments of the present invention is provided in conjunction with the specification.

Although the following descriptions illustrate in detail in order to facilitate understanding of the present invention, it should be understood by a skilled person in the art that the present invention can also be enabled by other ways not described herein. The skilled person in the art can also implement the present invention without departing from the spirit of the present invention such that the following descriptions concerning the examples will not limit the present invention.

In addition, the expressions "an embodiment" or "an example" used herein refers to including specific features, structure and characteristics of at least one embodiment of the present invention. "According to an embodiment of the present invention" appears in the present disclosure does not necessarily mean that it refers to the same embodiment, or it does not necessarily mean that it independently or selectively contradicts with one another.

EXAMPLES

Example 1

This example provides a method for preparing hydrogen-rich fuel gas by catalyzing and reforming biomass tar cracking using aluminum smelting waste residues, including:

(1) adding aluminum smelting waste residues into 0.5 mol/L of sulfuric acid and soaking for 2 h, filtering and baking an obtained precipitate at 350° C. for 4 h to obtain pre-treated aluminum smelting waste residues;

(2) adding the pre-treated aluminum smelting waste residues into 1 mol/L of acetic acid and performing ultrasonic treatment (ultrasonic frequency is 20 kHz, ultrasonic power is 600 W, processing time is 30 min), performing centrifugal separation (2000 r/min) on the solution, baking the aluminum ash solution for 4 h at a constant temperature of 450° C. in an air atmosphere, and naturally cooling the solution to room temperature to obtain a cracking catalyst;

(3) uniformly mixing the cracking catalyst and biomass (crushed poplar to 200 mesh) with a mass ratio of 1:1 to form a mixture, adding the mixture into a first-stage pyrolyzing furnace under 90 ml/min of nitrogen atmosphere, and heating from room temperature to 900° C. at a heating rate of 20° C./min to obtain first-stage pyrolysis gas; and (4) entering the first-stage pyrolysis gas into a second-stage pyrolyzing furnace for activation. Under the nitrogen atmosphere, the temperature of the secondary cracking furnace is raised to 600° C. at a rate of 20° C./min, and the heating time is 20 min. The liquid products, pyrolysis gas and char were obtained by reforming the gas and modulating the components, and the yields were 6%, 90% and 4%, respectively. Hydrogen yields were 224 ml/g, carbon monoxide yields were 90 ml/g, methane yields were 72 ml/g, and carbon dioxide yields were 99 ml/g.

Referring to the drawing for the system flowchart, in which 1 represents the pyrolysis furnace control system, 2 represents first-stage pyrolysis furnace, 3 represents second-stage pyrolysis furnace, 4 represents primary condenser, 5 represents secondary condenser, 6 represents tertiary condenser, 7 represents pyrolysis liquid product, 8 represents hydrogen-rich fuel gas.

Example 2

This example provides a method for preparing hydrogen-rich fuel gas by catalyzing and reforming biomass tar cracking using aluminum smelting waste residues, including:

(1) adding aluminum smelting waste residues into 1 mol/L of nitric acid and soaking for 2 h, filtering and baking an obtained precipitate at 350° C. for 4 h to obtain pre-treated aluminum smelting waste residues;

(2) adding the pre-treated aluminum smelting waste residues into 1 mol/L of acetic acid and performing ultrasonic treatment (ultrasonic frequency is 20 kHz, ultrasonic power is 600 W, processing time is 30 min), performing centrifugal separation (2000 r/min) on the solution, baking the aluminum ash solution for 4 h at a constant temperature of 450° C. in an air atmosphere, and naturally cooling the solution to room temperature to obtain a cracking catalyst;

(3) uniformly mixing the cracking catalyst and biomass (crushed poplar to 200 mesh) with a mass ratio of 1:1 to form a mixture, adding the mixture into a first-stage pyrolyzing furnace under 90 ml/min of nitrogen atmosphere, and heating from room temperature to 900° C. at a heating rate of 20° C./min to obtain first-stage pyrolysis gas; and (4) entering the first-stage pyrolysis gas into a second-stage pyrolyzing furnace for activation. Under the nitrogen atmosphere, the temperature of the secondary cracking furnace is raised to 600° C. at a rate of 20° C./min, and the heating time is 20 min. The liquid products, pyrolysis gas and char were obtained by reforming the gas and modulating the components, and the yields were 8%, 86% and 6%, respectively. Hydrogen yields were 202 ml/g.

Example 3

This example provides a method for preparing hydrogen-rich fuel gas by catalyzing and reforming biomass tar cracking using aluminum smelting waste residues, including:

(1) adding aluminum smelting waste residues into 0.5 mol/L of phosphoric acid and soaking for 2 h, filtering and baking an obtained precipitate at 350° C. for 4 h to obtain pre-treated aluminum smelting waste residues;

(2) adding the pre-treated aluminum smelting waste residues into 1 mol/L of acetic acid and performing ultrasonic treatment (ultrasonic frequency is 20 kHz, ultrasonic power is 600 W, processing time is 30 min), performing centrifugal separation (2000 r/min) on the solution, baking the aluminum ash solution for 4 h at a constant temperature of 450° C. in an air atmosphere, and naturally cooling the solution to room temperature to obtain a cracking catalyst;

(3) uniformly mixing the cracking catalyst and biomass (crushed poplar to 200 mesh) with a mass ratio of 1:1 to form a mixture, adding the mixture into a first-stage pyrolyzing furnace under 90 ml/min of nitrogen atmosphere, and heating from room temperature to 900° C. at a heating rate of 20° C./min to obtain first-stage pyrolysis gas; and (4) entering the first-stage pyrolysis gas into a second-stage pyrolyzing furnace for activation. Under the nitrogen atmosphere, the temperature of the secondary cracking furnace is raised to 600° C. at a rate of 20° C./min, and the heating time is 20 min. The liquid products, pyrolysis gas and char were obtained by reforming the gas and modulating the components, and the yields were 7%, 88% and 5%, respectively. Hydrogen yields were 212 ml/g.

Example 4

This example provides a method for preparing hydrogen-rich fuel gas by catalyzing and reforming biomass tar cracking using aluminum smelting waste residues, including:

(1) adding aluminum smelting waste residues into 1 mol/L of acetic acid and soaking for 2 h, filtering and baking an obtained precipitate at 350° C. for 4 h to obtain pre-treated aluminum smelting waste residues;

(2) adding the pre-treated aluminum smelting waste residues into 1 mol/L of acetic acid and performing ultrasonic treatment (ultrasonic frequency is 20 kHz, ultrasonic power is 600 W, processing time is 30 min), performing centrifugal separation (2000 r/min) on the solution, baking the aluminum ash solution for 4 h at a constant temperature of 450° C. in an air atmosphere, and naturally cooling the solution to room temperature to obtain a cracking catalyst;

(3) uniformly mixing the cracking catalyst and biomass (crushed poplar to 200 mesh) with a mass ratio of 1:1 to form a mixture, adding the mixture into a first-stage pyrolyzing furnace under 90 ml/min of nitrogen atmosphere, and heating from room temperature to 900° C. at a heating rate of 20° C./min to obtain first-stage pyrolysis gas; and (4) entering the first-stage pyrolysis gas into a second-stage pyrolyzing furnace for activation. Under the nitrogen atmosphere, the temperature of the secondary cracking furnace is raised to 600° C. at a rate of 20° C./min, and the heating time is 20 min. The liquid products, pyrolysis gas and char were obtained by reforming the gas and modulating the components, and the yields were 9%, 86% and 5%, respectively. Hydrogen yields were 218 ml/g.

Comparative Example 1

(1) adding aluminum smelting waste residues into 1 mol/L of acetic acid and performing ultrasonic treatment (ultrasonic frequency is 20 kHz, ultrasonic power is 600 W, processing time is 30 min), performing centrifugal separation (2000 r/min) on the solution, baking the aluminum ash solution for 4 h at a constant temperature of 450° C. in an air atmosphere, and naturally cooling the solution to room temperature to obtain a cracking catalyst;

(2) uniformly mixing the cracking catalyst and biomass (crushed poplar to 200 mesh) with a mass ratio of 1:1 to form a mixture, adding the mixture into a first-stage pyrolyzing furnace under 90 ml/min of nitrogen atmosphere, and heating from room temperature to 900° C. at a heating rate of 20° C./min to obtain first-stage pyrolysis gas; and (3) entering the first-stage pyrolysis gas into a second-stage pyrolyzing furnace for activation. Under the nitrogen atmosphere, the temperature of the secondary cracking furnace is raised to 600° C. at a rate of 20° C./min, and the heating time is 20 min. The liquid products, pyrolysis gas and char were obtained by reforming the gas and modulating the components, and the yields were 11%, 67% and 22%, respectively. Hydrogen yields were 150 ml/g, carbon monoxide yields were 155 ml/g, methane yields were 72 ml/g, and carbon dioxide yields were 99 ml/g.

Comparative Example 2

Under the conditions of Example 1, the aluminum smelting waste residues and biomass (crushed poplar to 200 mesh) were directly mixed in a mass ratio of 1:1. The mixture was then introduced into the first-stage pyrolyzing furnace under 90 ml/min of nitrogen atmosphere, and heating from room temperature to 900° C. at a heating rate of 20° C./min to obtain first-stage pyrolysis gas; and entering the first-stage pyrolysis gas into a second-stage pyrolyzing furnace for activation. Under the nitrogen atmosphere, the temperature of the secondary cracking furnace is raised to 600° C. at a rate of 20° C./min, and the heating time is 20 min. The liquid products, pyrolysis gas and char were obtained by reforming the gas and modulating the components, and the yields were 14%, 80% and 6%, respectively. Hydrogen yields were 120 ml/g.

Comparative Example 3

This example provides a method for preparing hydrogen-rich fuel gas by catalyzing and reforming biomass tar cracking using aluminum smelting waste residues, including:

(1) adding aluminum smelting waste residues into 0.5 mol/L of sulfuric acid and soaking for 2 h, filtering and baking an obtained precipitate at 350° C. for 4 h to obtain pre-treated aluminum smelting waste residues;

(2) adding the pre-treated aluminum smelting waste residues into 0.5 mol/L of sulfuric acid and performing ultrasonic treatment (ultrasonic frequency is 20 kHz, ultrasonic power is 600 W, processing time is 30 min), performing centrifugal separation (2000 r/min) on the solution, baking the aluminum ash solution for 4 h at a constant temperature of 450° C. in an air atmosphere, and naturally cooling the solution to room temperature to obtain a cracking catalyst;

(3) uniformly mixing the cracking catalyst and biomass (crushed poplar to 200 mesh) with a mass ratio of 1:1 to form a mixture, adding the mixture into a first-stage pyrolyzing furnace under 90 ml/min of nitrogen atmosphere, and heating from room temperature to 900° C. at a heating rate of 20° C./min to obtain first-stage pyrolysis gas; and (4) entering the first-stage pyrolysis gas into a second-stage pyrolyzing furnace for activation. Under the nitrogen atmosphere, the temperature of the secondary cracking furnace is raised to 600° C. at a rate of 20° C./min, and the heating time is 20 min. The liquid products, pyrolysis gas and char were obtained by reforming the gas and modulating the components, and the yields were 12%, 82% and 6%, respectively. Hydrogen yields were 204 ml/g.

Comparative Example 4

Under the conditions of Example 1, the effect of different sulfuric acid concentrations on the performance of hydrogen-rich fuel gas was investigated. The experimental conditions and results are shown in Table 1.

TABLE 1

|  | Experiment 1 | Experiment 2 | Experiment 3 | Experiment 4 |
|---|---|---|---|---|
| Sulfuric acid concentration mol/L | 0.1 | 0.3 | 0.8 | 1 |
| Hydrogen yield ml/g | 142 | 203 | 212 | 208 |

The present invention utilizes a medium strong acid to remove the lightweight ash from the surface of aluminum smelting waste residues, resulting in aluminum ash powder with a purity of over 99% $Al_2O_3$ after calcination. Subsequently, 1-5 mol/L of weak acid is used to ultrasonically activate the aluminum smelting waste residues. Due to appropriate competitive adsorption that alters the composition of metal active species, resulting in increased specific surface area and pore size, the obtained product was subjected to centrifugal separation and then underwent constant-temperature baking at 400-500° C. in an air atmosphere for 3-6 hours to achieve the optimal directed production of hydrogen-rich fuel gas.

It is worth noting that the foregoing examples are only used for illustration of the technical solutions of the present invention and non-limiting thereto. Though reference is made to preferred examples for detailed illustration of the present invention, a skilled person in the art should understand that the technical solutions provided by the present invention can vary or be substituted by equivalents without departing from the spirit and scope of the technical solutions described herein, which should fall within the scope of the appended claims.

What is claimed is:

1. A method for preparing hydrogen-rich fuel gas by catalyzing biomass tar cracking using aluminum smelting waste residues, comprising:

adding aluminum smelting waste residues into an acid selected from nitric acid, phosphoric acid or sulfuric acid and soaking for 2-4 h, filtering and baking an obtained precipitate at 300° C. to 400° C. for 3-6 h to obtain pre-treated aluminum smelting waste residues;

adding the pre-treated aluminum smelting waste residues into a weak acid and performing ultrasonic treatment to obtain an aluminum ash solution, performing centrifugal separation on the aluminum ash solution, baking the aluminum ash solution for 3-6 h at a constant temperature of 400° C. to 500° C. in an air atmosphere, and naturally cooling the aluminum ash solution to room temperature to obtain a cracking catalyst;

uniformly mixing the cracking catalyst and biomass with a mass ratio of 1:1 to form a mixture, adding the mixture into a first-stage pyrolyzing furnace under nitrogen atmosphere, and heating from room temperature to 500° C. to 900° C. to obtain first-stage pyrolysis gas; and entering the first-stage pyrolysis gas into a second-stage pyrolyzing furnace for secondary catalytic cracking, so as to obtain the hydrogen-rich fuel gas.

2. The method for preparing hydrogen-rich fuel gas by catalyzing biomass tar cracking using aluminum smelting waste residues of claim 1, wherein the acid selected from nitric acid, phosphoric acid or sulfuric acid has a concentration of 0.2 mol/L to 1 mol/L.

3. The method for preparing hydrogen-rich fuel gas by catalyzing biomass tar cracking using aluminum smelting waste residues of claim 1, wherein the weak acid comprises acetic acid, hydrofluoric acid, or phenol.

4. The method for preparing hydrogen-rich fuel gas by catalyzing biomass tar cracking using aluminum smelting waste residues of claim 1, wherein the weak acid has a concentration of 1 mol/L to 5 mol/L.

5. The method for preparing hydrogen-rich fuel gas by catalyzing biomass tar cracking using aluminum smelting waste residues of claim 1, wherein the first-stage pyrolyzing furnace has a heating rate of 20° C./min.

6. The method for preparing hydrogen-rich fuel gas by catalyzing biomass tar cracking using aluminum smelting waste residues of claim 1, wherein the secondary catalytic cracking refers to heating the second-stage pyrolyzing furnace in the nitrogen atmosphere at a heating rate of 20° C./min until reaching a temperature of 500-900° C., and maintaining the heating for 20-30 minutes.

7. The method for preparing hydrogen-rich fuel gas by catalyzing biomass tar cracking using aluminum smelting waste residues of claim 1, wherein the secondary catalytic cracking yields liquid products, pyrolysis gases, and char, with respective yields of 6%, 90%, and 4% by weight, based on the total weight of products obtained from the secondary catalytic cracking step.

8. The method for preparing hydrogen-rich fuel gas by catalyzing biomass tar cracking using aluminum smelting waste residues of claim 7, wherein hydrogen yield is 224 ml/g, carbon monoxide yield is 90 ml/g, methane yield is 72 ml/g, and carbon dioxide yield is 99 ml/g in the pyrolysis gases.

9. The method for preparing hydrogen-rich fuel gas by catalyzing biomass tar cracking using aluminum smelting waste residues of claim 1, wherein the biomass comprises corn stalks, poplar wood, or pine wood with a particle size ranging from 200 mesh to 400 mesh.

* * * * *